United States Patent
Suonvieri

(10) Patent No.: US 9,473,975 B2
(45) Date of Patent: Oct. 18, 2016

(54) CAPACITY ALLOCATION IN COMMUNICATIONS

(75) Inventor: Jukka Pekka Suonvieri, Terälahti (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 292 days.

(21) Appl. No.: 14/008,741

(22) PCT Filed: Apr. 1, 2011

(86) PCT No.: PCT/EP2011/055084
§ 371 (c)(1),
(2), (4) Date: Dec. 9, 2013

(87) PCT Pub. No.: WO2012/130324
PCT Pub. Date: Oct. 4, 2012

(65) Prior Publication Data
US 2014/0086049 A1    Mar. 27, 2014

(51) Int. Cl.
H04W 28/02    (2009.01)
H04W 28/22    (2009.01)

(52) U.S. Cl.
CPC ......... H04W 28/0268 (2013.01); H04W 28/22 (2013.01)

(58) Field of Classification Search
CPC ........... H04W 28/0268; H04W 28/22; H04W 28/10; H04W 28/16; H04W 28/18; H04W 28/20; H04W 28/24
See application file for complete search history.

(56) References Cited

U.S. PATENT DOCUMENTS

| | | | |
|---|---|---|---|
| 2002/0075834 A1* | 6/2002 | Shah et al. | 370/337 |
| 2002/0082051 A1 | 6/2002 | Tangorra et al. | |
| 2002/0128017 A1* | 9/2002 | Virtanen | 455/452 |
| 2003/0169460 A1* | 9/2003 | Liao et al. | 358/426.08 |
| 2004/0110494 A1* | 6/2004 | Cohen | H04M 1/72522 455/414.1 |
| 2006/0234760 A1 | 10/2006 | Cheng | |
| 2007/0037573 A1* | 2/2007 | Kyung | H04W 28/18 455/435.2 |
| 2007/0195788 A1* | 8/2007 | Vasamsetti et al. | 370/395.21 |
| 2008/0205443 A1* | 8/2008 | Shi et al. | 370/468 |

(Continued)

FOREIGN PATENT DOCUMENTS

| | | |
|---|---|---|
| WO | 2007/109695 A1 | 9/2007 |
| WO | 2012035625 A1 | 3/2012 |

OTHER PUBLICATIONS

International Search Report and Written Opinion mailed Dec. 23, 2011 issued in corresponding International Application No. PCT/EP2011/055084.
Japanese Office Action, Notification of Reasons(s) for Rejection application No. 2014-501452 dated Sep. 10, 2014.

*Primary Examiner* — Benjamin H Elliott, IV
(74) *Attorney, Agent, or Firm* — Squire Patton Boggs (US) LLP

(57) ABSTRACT

A capacity allocation method comprises receiving (303), in a network apparatus (101), a capacity request message regarding a user terminal (102). In response to receiving the capacity request message, the apparatus (101) checks (303) one or more service parameters related to the user terminal (102). If the checking (303) reveals that enhanced network service activation criteria are fulfilled, the service parameters are used to define (303), by using a suitable network algorithm, a temporarily enhanced network service for the user terminal (102) such that the temporarily enhanced network service exceeds the service level originally agreed for the user terminal (102).

23 Claims, 4 Drawing Sheets

(56) References Cited

U.S. PATENT DOCUMENTS

| | | | |
|---|---|---|---|
| 2009/0178058 A1* | 7/2009 | Stillwell, III | H04L 67/322 719/317 |
| 2011/0294456 A1* | 12/2011 | Anderson et al. | 455/404.1 |
| 2012/0140620 A1* | 6/2012 | Hogan | H04L 41/0893 370/230 |
| 2014/0086049 A1* | 3/2014 | Suonvieri | H04W 28/0268 370/230 |

* cited by examiner

CAPACITY ALLOCATION IN COMMUNICATIONS

FIELD OF THE INVENTION

The exemplary and non-limiting embodiments of this invention relate generally to wireless communications networks, and more particularly to capacity allocation.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Location-based services (LBS) refer to data services accessible with mobile devices through the mobile network and utilizing the ability to make use of the geographical position of a mobile device. LBS include services to identify a location of a person or object, such as discovering the nearest banking cash machine or the whereabouts of a friend. LBS may include e.g. vehicle tracking services, mobile commerce when taking the form of coupons or advertising directed at customers based on their current location, personalized weather services, and even location-based games.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatus, user equipment, and a computer-readable storage medium as defined in the independent claims. Further embodiments of the invention are disclosed in the dependent claims.

An aspect of the invention relates to a method of capacity allocation in a communications system comprising a network apparatus, the method comprising receiving, in the network apparatus, a capacity request message regarding a user terminal; in response to receiving the capacity request message, checking, in the network apparatus, one or more service parameters related to the user terminal; wherein if the checking reveals that enhanced network service activation criteria are fulfilled, said one or more service parameters are used to define, by using a suitable network algorithm, a temporarily enhanced network service for the user terminal, the temporarily enhanced network service exceeding the service level originally agreed for the user terminal.

A further aspect of the invention relates to an apparatus for communications, wherein the apparatus is configured to receive a capacity request message regarding a user terminal; in response to receiving the capacity request message, check one or more service parameters related to the user terminal; wherein if the checking reveals that enhanced network service activation criteria are fulfilled, the apparatus is configured to use said one or more service parameters to define, by using a suitable network algorithm, a temporarily enhanced network service for the user terminal, the temporarily enhanced network service exceeding the service level originally agreed for the user terminal.

A still further aspect of the invention relates to a user equipment for communications, wherein the user equipment is configured to in response to a call setup event or call maintenance event in the user equipment, transmit a capacity request message to a network apparatus; receive a capacity response message from the network apparatus; wherein if the capacity response message includes information on a temporarily enhanced network service defined for the user equipment by using a suitable network algorithm, the temporarily enhanced network service exceeding the service level originally agreed for the user terminal, the user equipment is configured to utilize the temporarily enhanced network service during the call.

A still further aspect of the invention relates to a computer-readable storage medium embodying a program of instructions executable by a processor to perform actions directed toward receiving, in a network apparatus, a capacity request message regarding a user terminal; in response to receiving the capacity request message, checking, in the network apparatus, one or more service parameters related to the user terminal; wherein if the checking reveals that enhanced network service activation criteria are fulfilled, said one or more service parameters are used to define, by using a suitable network algorithm, a temporarily enhanced network service for the user terminal, the temporarily enhanced network service exceeding the service level originally agreed for the user terminal.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
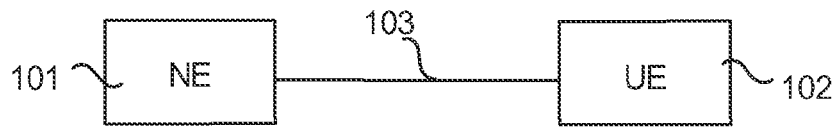
FIG. 1 shows a simplified block diagram illustrating exemplary system architecture.

An exemplary embodiment relates to location-based data throughput and other network services experienced by a mobile subscriber. 3G networks, with continuously increased data speed enhancements, offer new possibilities of available services. LTE networks again bring a decade step of maximum data speed rates available to a user. Location-based services (LBS) are estimated to have a high business value for network operators and network vendors. The users expect LBS to offer a new positive experience, something new.

Current methods for activating of new services for an individual mobile user device based on the location of the user equipment (or based on some other criteria) are clumsy and do not respond to end-user experience expectations.

Currently there exists no method for dynamical network service allocation. Currently, maximum allowed data throughput (speed) of mobile connection and other services offered to the subscriber by the network are fixed by a service level agreement (SLA) or by quality of service (QoS), between the subscriber and the network operator. An SLA parameter is then used in network algorithms (for example, in admission control algorithms and/or packet scheduler algorithms) to define maximum allowed data speed for a certain user. A predefined maximum data speed is utilized throughout the whole network without the possibility to flexibly adjust the maximum allowed data speed according to various use cases. Packet scheduler (PS) represents a typical data speed allocation algorithm for dynamically adjusting SLA-based packet speed parameters. Also other network services available to the mobile subscribers may be based on fixed agreements. Multi-broadcasting (MBMS) or mobile TV may be examples of these. They cannot be flexibly activated and/or deactivated online based on several criteria.

There are several use cases that may require a temporarily increased data speed or activation of additional network services. Such use cases may include, for example:

1) A marketing campaign ordered by a shopping centre (location-based network service enhancement triggering). Shopping centres or other 3rd party companies may wish to "pull in" or otherwise better serve their customers by offering faster data speed or other network services in their premises. Shopping centre online video advertising may go smoother to customer's mobiles, customers may be interested to experience higher data speed. In a "customer pull in" video there may be a mobile interactive "lottery" where customers download marketing material online into the mobile phone and answer online to questions, follow a certain guided walking path in the shopping centre etc., and see additional advertising or product information on their mobile phones while moving around the shopping centre and selecting products. A large shopping centre may offer online building maps for downloading to customer's mobile phones. This service requires high data rates to satisfy each customer. Anyhow, the customers may have very different SLAB with operators, some may have no data capabilities at all, some may have capabilities with a very limited allowed monthly data transfer amount etc. For each customer, it is advantageous if they do not need to pay data fee caused by the marketing material or by other shopping centre material downloading. Also it is advantageous if that material gets downloaded as fast as possible to the customers' mobile devices. Multi-broadcasting service may be a useful example of an additional service offered by a 3rd party. A shopping centre or another 3rd party company pays extra fee to the network operator according to free services the shopping centre offers to their customers. There are also other possible scenarios that may utilise dynamical network resource allocation, such as safety instructions by authorities directly to mobile devices, online traffic instructions, public transport schedules automatically into mobiles when user enters certain area or orders them from a transport company. These downloads may be free for mobile device users and work as fast as possible.

2) Time based triggering. During a low traffic period, the network operator may offer faster connections or other services to reduce high network load in rush hours. The subscribers change their network usage behaviour according to the operator's benefits.

3) Reward based triggering (selected users temporarily get extra network services). Based on several criteria selected by the operator, a user gets enhanced network services over the network, selected areas, time etc. 3rd party companies may order temporary data speed upgrade from the operator for their customers as a reward for a good customer. These enhanced services may be available for a large area or over the whole network. The 3rd party company pays an extra fee for the operator. The operator increases a user friendly brand, having a better user experience.

4) "One time" call triggering. There may be a need to activate a certain network service even for a single call. A video call for a certain "low quality SLA" subscriber may require a temporarily increased data speed. A friend activating the video call pays an extra fee to the operator. Currently, there is no automatic monitoring of usage of temporary network parameters. Thus no automatic monitoring of flexible service allocations exists. When a lot of dynamic service activation and deactivation occurs automatically, it is not possible for the operator to manually activate each monitoring session. The user experience of automatically launched services may be carefully monitored, as they are paid by the 3rd party companies and relate to their customers' brand. Continuous activation of monitoring, setting correct monitoring parameters and deactivating monitoring cannot be handled manually because they occur randomly and the number of monitoring sessions is large. In current systems, there is no possibility to dynamically adjust data speed or other network service parameters.

An exemplary embodiment presents additional parameters to network data speed algorithms (admission control, packet scheduler, handover control, load control, medium access control, eNB application control, radio link control, radio resource control, transport resource manager, MW element, etc. algorithms) to adjust maximum allowed speed of data connection according to several use cases. An exemplary embodiment also presents temporarily activating and deactivating of other network services, normally requiring fixed SLA between the subscriber and the network operator. An exemplary embodiment presents a data storage of temporary parameters and a method for sharing parameters to each relevant algorithm and network element. When the maximum allowed data speed is defined for a user during call setup and call maintaining process, these additional temporary parameters are checked. In case parameter indicates that a temporarily increased data speed is allowed, they temporarily override the speed defined by the subscriber's SLA. Some important network level fixed parameters may be defined not to be overridden, such as base station or cell level maximum allowed data speed. When criteria for upgraded data speed are lost, for example, when the user moves away from the specified location or the time runs out, then the data speed according to a fixed SLA is used and additional parameters are deactivated for the user.

An exemplary embodiment also presents additional automatic monitoring of usage of data speed upgrades or additional network services. This helps a campaign owner to analyse the interest rate of the campaign: how actively the customers actually participated the campaign, did they respond to possible questions. Automatic monitoring also helps the network operator to follow up technical details (call success ratio, data throughput, number of users etc.) of the additional service. The monitoring helps the network operator to evaluate campaign benefits against network resource usage.

An exemplary embodiment offers the possibility to flexibly adjust the maximum allowed data speed according to different use cases.

At call setup and maintaining phase, in addition to normal SLA parameter(s) (maximum data speed, allowed services, etc.) setting, one or more additional parameters are checked and taken into use if activation criteria are fulfilled.

The additional parameters for network algorithms may include at least:

location where additional speed or other service is available to user, time when upgrade is valid, subscriber or user equipment network identification (phone number, IMSI, IMEI code, etc.), upgrade step (for example, maximum available speed, 1 Mbit/s, 10 Mbit/s, etc., offered additional services for SLA), data amount available for enhanced service (for example, unlimited, 50 Mbyte, 100 Mbyte, etc.), free calls/lowered data transfer cost indicator, identification (ID) of network elements that are affected, for example, RNC 2,61.

Additional parameters may also include:

list of offered enhanced network services, information on a charged account/virtual SIM, campaign code/identification, These parameters are stored in a data storage that is available for standard network algorithms and register functions. All or a part of these parameters may be used to define a new temporary QoS or other enhanced network services to the mobile user(s).

The network operator may define one or more network areas where an increased data speed is available. The areas are defined in the data storage where the areas may be identified according to the used location technology (network measurement based location such as (group of) cell IDs or GPS based coordinates). The user equipment location may be defined during network capacity request messages between the user equipment and the network. At least radio network cell identification is usually available; also other more accurate location methods may be available, depending on the user equipment location (inside/outside building) and capabilities (such as GPS).

During call setup and maintaining procedures, these temporary parameters are checked and taken into account when specifying maximum allowed data speed and other network services (such as multi-broadcast, mobile TV, and/or packet data service (which would normally require a fixed agreement between the operator and the subscriber in order to be provided by the operator to the user of the service)). The fixed parameters may be stored in HLR and/or VLR and checked there at call setup phase. The additional parameters may be stored in HLR, VLR and/or RNC to be used in network resource allocation phase.

During a call, temporary parameters such as the location of the user equipment, transferred data amount and time may be constantly monitored by the network. In case some trigger indicates a need to deactivate an enhanced service (for example, the user has moved away from the "campaign area"), normal (fixed) SLA parameters may be taken into use.

In an exemplary embodiment, if the connection, data transfer, or other network service is paid by the 3rd party such as the shopping centre, there exists an identification of the charged account. The account may refer to a "virtual SIM" that collects the charges of the calls made in the target area or by selected subscribers, according to other temporary parameters. Virtual SIM charging may be used to avoid normal charging of data transfer or other network services. The calls that are made under the conditions specified by the temporary parameters, may thus be charged using a "virtual SIM" account in a charging network element.

In an exemplary embodiment, the usage of the enhanced services is automatically monitored. When the additional services are activated there is provided an apparatus that automatically activates monitoring of those services using the same parameters that were used in service enhancement.

The activation of the monitoring is done by sending necessary activation commands to monitoring tools included with these automatically generated parameters. In case a standardized subscriber and equipment trace is used, the following notification may be taken into account: a 3GPP-standardized "subscriber and UE trace" may be activated in the network with relevant parameters like subscriber's identification (IMSI) or UE identification (IMEI) code.

As the user's identification and location in the network is already known at the monitoring function activation phase, a standardized management based activation (MBA) may be used in RNC. Methods to activate trace may include management activation/deactivation between RNC and the subscriber, signalling activation between MSC/SGSN and RNC, direct activation between network and MSC/SGSN, and activation between network and MSC/SGSN via HLR. The trace reports are sent from RNC or MSC/SGSN to the network, respectively. There are certain benefits from using MBA: network signalling load becomes smaller, and it may be used even if core network elements do not support a subscriber and equipment trace function. As the trace capacity to monitor each active enhanced user may be limited, there may be other more powerful monitoring tools activated.

The automatically activated monitoring tools use the parameters specified in above mentioned data storage combined with the data used the by the network elements during the call setup phase (UE location, UE capabilities, etc.). This enables the monitoring tools to automatically focus on a dedicated group of users/services. Tools, such as an RNC internal layer 3 signalling monitor, monitor in real time a wide set of network counters and KPIs. These tools may be scaled for the whole network element to offer real time monitoring.

The purpose of automatic monitoring is to produce a report to third parties (e.g. partner network operators) on the usage of supplementary services. The report may include a number of users report, a quality of service report, location data report etc. user information produced e.g. by the trace function and other monitoring tools such as network monitoring and/or signalling monitoring tools.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support location-based services. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE network, without restricting the embodiment to such an architecture, however. The invention is not limited to the LTE radio systems but can also be implemented in other radio systems, such as UMTS, GSM, EDGE, WCDMA, bluetooth network, WLAN or other mobile or wireless network. In an embodiment, the presented solution may be applied between user equipment belonging to different but compatible systems such as LTE and UMTS.

A general architecture of a communication system providing location-based services is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 1 comprises a network apparatus 101 of a network operator. The network apparatus 101 may include e.g. a radio network controller (RNC), enhanced node-B (eNB), a base station (BS), access point (AP), MSC server (MSS), mobile switching centre (MSC), serving GPRS support node (SGSN), mobility management entity (MME), home location register (HLR), home subscriber server (HSS), visitor location register (VLR) or any other network element or a combination of network elements. FIG. 1 shows a user equipment 102 located in the service area of the network apparatus 101. The network apparatus 101 may be connected to the user equipment e.g. via a connection 103.

The user equipment refers to a portable computing device, and it may also be referred to as a user terminal. Such computing devices include wireless mobile communication devices operating with or without a subscriber identification module (SIM), including, but not limited to, the following types of devices: mobile phone, smart-phone, personal digital assistant (PDA), handset, laptop computer. In the example situation of FIG. 1, the network element 101 and the user equipment 102 are capable of connecting to each other via an access network via the connection 103.

FIG. 1 only illustrates a simplified example. In practice, the net-work may include more network elements and user terminals, and more cells may be formed by the network elements. The networks of two or more operators may overlap, the sizes and form of the cells may vary from what is depicted in FIG. 1, etc. The communication system may also be able to communicate with other networks, such as a public switched telephone network. The embodiments are not, however, restricted to the network given above as an example, but a person skilled in the art may apply the solution to other communication networks provided with the necessary properties. For example, the connections between different network elements may be realized with internet protocol (IP) connections.

Figure 2:
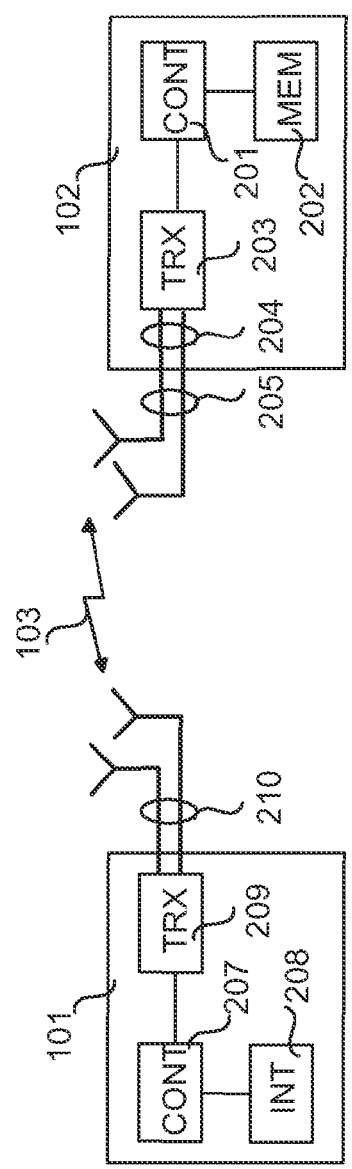
FIG. 2 shows a simplified block diagram illustrating exemplary apparatuses.

FIG. 2 illustrates examples of apparatuses according to embodiments of the invention. FIG. 2 shows a user equipment 102 located in the area of the network element or NE 101. The user equipment is configured to be in connection with the network element 101. The user equipment or UE 102 comprises a controller 201 operationally connected to a memory 202 and a transceiver 203. The controller 201 controls the operation of the user equipment 102. The memory 202 is configured to store software and data. The transceiver 203 is configured to set up and maintain a wireless connection to the network element 101. The transceiver may be operationally connected to a set of antenna ports 204 connected to an antenna arrangement 205. The antenna arrangement 205 may comprise a set of antennas. The number of antennas may be one to four, for example. The number of antennas is not limited to any particular number. The user equipment 102 may also comprise various other components, such as a user interface, camera, and media player. They are not displayed in the figure due to simplicity. The network element or NE 101 comprises a controller 207 operationally connected to an interface 208 and a transceiver 209. The controller 207 controls the operation of the network element 101. The interface 208 is configured to setup and maintain the connection with a further network element (not shown). The transceiver 209 is configured to set up and maintain a wireless connection to the user equipment 102 within the service area of the network element 101. The transceiver 209 may be operationally connected to an antenna arrangement 210. The antenna arrangement may comprise a set of antennas. The number of antennas may be two to four, for example. The number of antennas is not limited to any particular number. The network element 101 may be operationally connected (directly or indirectly) to a further network element (not shown) of the communication system. The further network element may be a radio network controller (RNC), MSC server (MSS), serving GPRS support node, mobility management entity (MME), home location register (HLR), home subscriber server (HSS), visitor location register (VLR), a gateway, or a server, for example.

The embodiments are not, however, restricted to the network given above as an example, but a person skilled in the art may apply the solution to other communication networks provided with the necessary properties. For example, the connections between different network elements may be realized with internet protocol (IP) connections.

The memory may include volatile and/or non-volatile memory and typically stores content, data, or the like. For example, the memory may store computer program code such as software applications (for example for the detector unit and/or for the adjuster unit) or operating systems, information, data, content, or the like for the processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art. User equipment may refer to any user communication device. A term "user equipment" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal. Thus, the application capabilities of the device according to various embodiments of the invention may include native applications available in the terminal, or subsequently installed applications. The messaging service center may be implemented in any network element, such as a server.

FIG. 2 is a block diagram of an apparatus according to an embodiment of the invention. Although the apparatus has been depicted as one entity, different modules and memory may be implemented in one or more physical or logical entities.

The functionality of the network element 101 is described in more detail below with FIGS. 3 to 5. It should be appreciated that the apparatus 101 may comprise other units used in or for capacity allocation. However, they are irrelevant to the actual invention and, therefore, they need not to be discussed in more detail here.

The apparatus may also be a user terminal which is a piece of equipment or a device that associates, or is arranged to associate, the user terminal and its user with a subscription and allows a user to interact with a communications system.

The user terminal presents information to the user and allows the user to input information. In other words, the user terminal may be any terminal capable of receiving information from and/or transmitting in-formation to the network, connectable to the network wirelessly or via a fixed connection. Examples of the user terminal include a personal computer, a game console, a laptop (a notebook), a personal digital assistant, a mobile station (mobile phone), and a line telephone.

The apparatus 101 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 3:
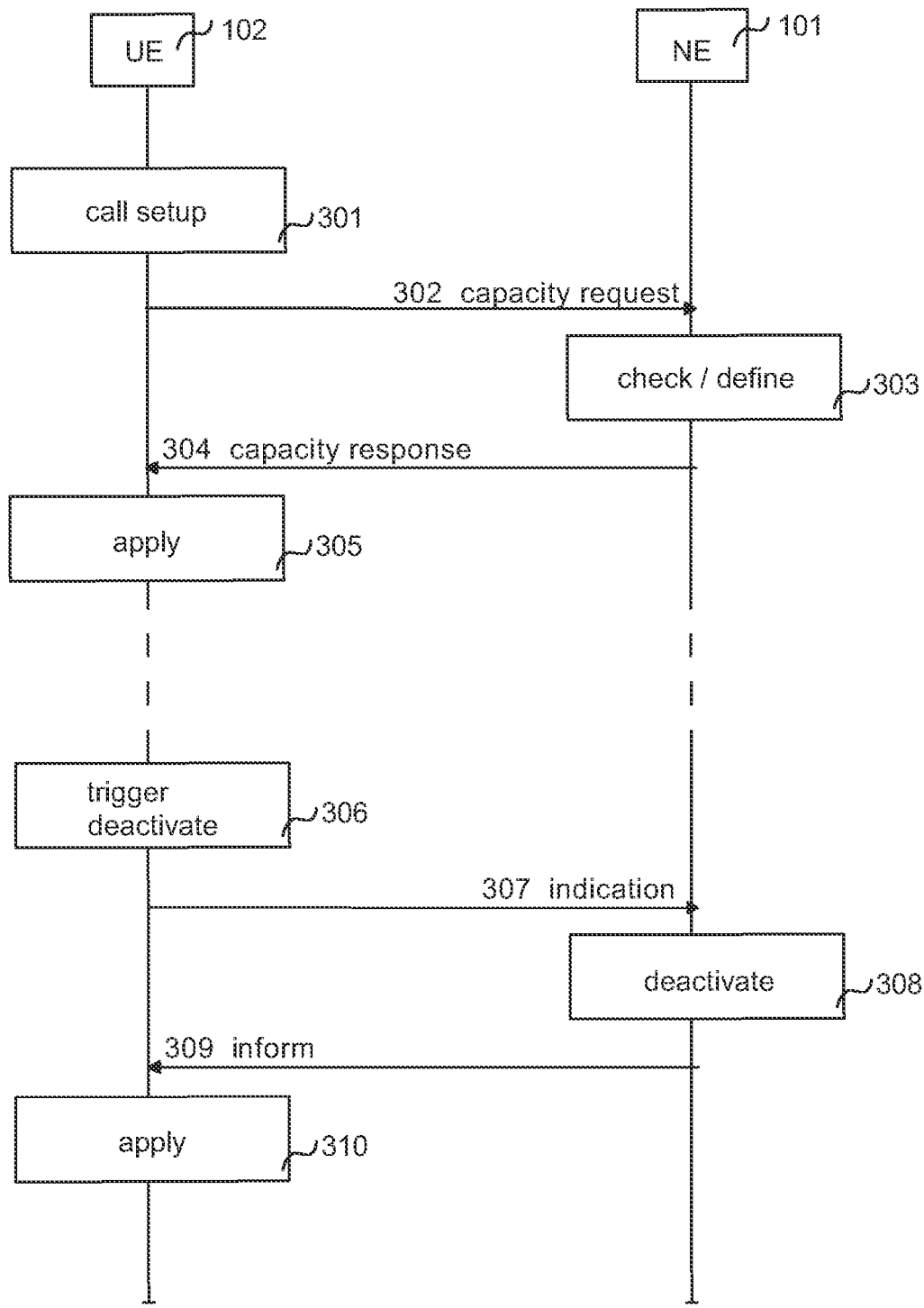
FIG. 3 shows a messaging diagram illustrating an exemplary messaging event according to an embodiment of the invention.

The signaling chart of FIG. 3 illustrates the required signaling. In the example of FIG. 3, a user terminal 102 performs, in step 301, a triggering event such as an event related to setting up a call or maintaining a call. In response to the triggering event 301, a network capacity request message 302 is transmitted from the user terminal 102 to a network apparatus 101 comprising e.g. a radio network controller (RNC) or a base station (eNB). In response to receiving the network capacity request message, the network apparatus 101 is configured to check 303 (in addition to normal SLA parameters such as maximum data speed, allowed services, etc.) one or more additional parameters. These additional parameters to be checked may include parameters such as the location where additional speed or other service is available, time when upgrade is valid, subscriber/user equipment identification (e.g. phone number, IMSI, IMEI code, etc.), upgrade step (e.g. maximum available speed, 1 Mbit/s, 10 Mbit/s, etc., offered additional services for SLA), data amount available for enhanced service (e.g. unlimited, 50 Mbyte, 100 Mbyte, etc.), free calls/lowered data transfer cost indicator, identification (ID) of network elements that are affected (e.g. RNC 2,61), list of enhanced network services being offered, information on charged account/virtual SIM, and/or a campaign code/identification.

If the checking 303 reveals that activation criteria are fulfilled, said one or more additional parameters may be used to define, in step 303, a new temporary QoS, a new temporary maximum data speed and/or another new (enhanced) temporary network service for the user terminal 102, by using a suitable network algorithm. Suitable network algorithms used for the defining may include e.g. an admission control algorithm, a packet scheduler algorithm, a messages waiting algorithm, and/or a home location register algorithm. Another option is that the capacity request message 302 is transmitted e.g. from a core network node (such as MSC) to the network apparatus. In that case the capacity request message may include a RAB assignment request defining the desired capacity. The access network (RNC or eNB) then reserves 303 the capacity for UE if available and if the other parameters allow the reservation. In a capacity response message 304, the network element may be configured to transmit, to the user terminal, an acknowledgement informing the user terminal 102 on the enhanced service. In step 305, the user terminal 102 is able to start to use the enhanced service in communications in the network (in the area/during the time defined by the network element 101). During the call, temporary parameters such as the location of the user equipment 102, transferred data amount and time are constantly monitored by the network. In case some trigger indicates a need to deactivate an enhanced service (for example, the user has moved away from the "campaign area"), normal (fixed) SLA parameters may be taken into use. For example, in step 306, the user terminal 102 may leave the area were the enhanced service was defined to be used. The network element 101 receives, in step 308, an indication 307 that the user terminal 102 is leaving/has left the area (i.e. deactivation criteria is fulfilled). In response to that the network element 101 is configured to deactivate 308 the enhanced service for the user terminal 102. The network may inform the user terminal on the deactivation by transmitting a message 309 to the user terminal. In response to receiving the message 309, the user terminal starts to use the "normal" SLA parameters (instead of the temporarily enhanced service parameters).

It should be noted that the activation/deactivation of the enhanced service may be triggered by an event in the user terminal and/or by an event in the network element. It should also be noted that the parameters may be checked during call setup phase, call maintenance phase, and/or during a resource allocation phase. It should further be noted that the parameters may be stored in a network node such as RNC, eNB, HLR and/or VLR, and the parameter values may be fixed or temporary.

Figure 4:
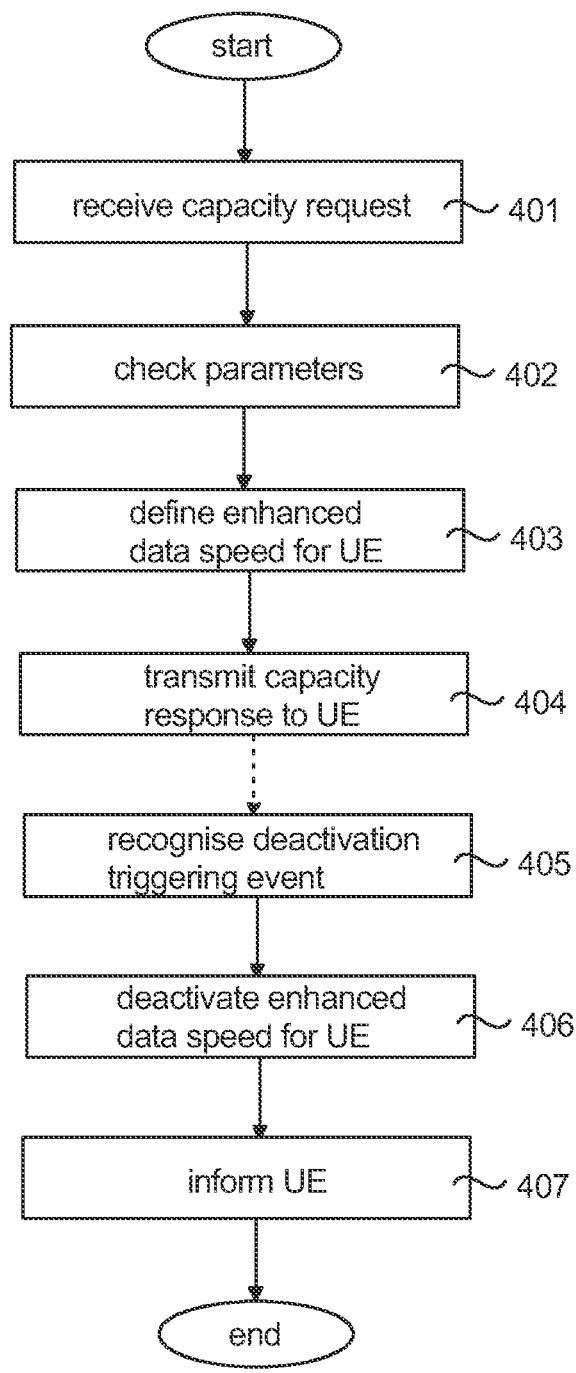
FIG. 4 shows a schematic diagram of a flow chart according to an exemplary embodiment of the invention.

FIG. 4 is a flow chart illustrating an exemplary embodiment. The apparatus 101, which may comprise e.g. a radio network controller (RNC) or a base station (eNB), is configured to receive 401 a network capacity request message (or some other message related to setting up a call or maintaining a call) transmitted from the user terminal 102 to the network apparatus 101. In response to receiving the network capacity request message, the network apparatus 101 is configured to check 402 (in addition to normal SLA parameters such as maximum data speed, allowed services, etc.) one or more additional parameters. These additional parameters to be checked may include parameters such as the location where additional speed or other service is available, time when upgrade is valid, subscriber/user equipment identification (e.g. phone number, IMSI, IMEI code, etc.), upgrade step (e.g. maximum available speed, 1 Mbit/s, 10 Mbit/s, etc., offered additional services for SLA), data amount available for enhanced service (e.g. unlimited, 50 Mbyte, 100 Mbyte, etc.), free calls/lowered data transfer cost indicator, identification (ID) of network elements that are affected (e.g. RNC 2,61), list of enhanced network services being offered, information on charged account/virtual SIM, and/or a campaign code/identification.

If the checking 402 reveals that activation criteria are fulfilled, said one or more additional parameters may be used to define, in step 403, a new temporary QoS, a new temporary maximum data speed and/or another new (enhanced) temporary network service for the user terminal 102, by using a suitable network algorithm. Suitable network algorithms used for the defining may include one more of an admission control algorithm, a packet scheduler algorithm, a messages waiting algorithm, and/or a home location register algorithm. Another option is that the capacity request message is received e.g. from a core network node (such as MSC). In that case the capacity request message may include a RAB assignment request defining the desired capacity. The access network (RNC or eNB) then reserves 402, 403 the capacity for UE if available and if the other parameters allow the reservation. The network element may be configured to transmit 404, in a capacity response message, to the user terminal 102, an acknowledgement informing the user terminal 102 on the enhanced service that the user terminal 102 is able to start to use in communications in the network (in the area/during the time defined by the network element 101). During the call, temporary parameters such as the location of the user equipment 102, transferred data amount and time are constantly monitored 405 by the network. In case some trigger indicates a need to deactivate an enhanced service (for example, the network element recognizes 405 that the user terminal has moved away from the "campaign area"), normal (fixed) SLA parameters may be taken into use. The network element 101 may receive, in step 405, an indication that the user terminal 102 is leaving/has left the area (i.e. deactivation criteria is fulfilled). In response to that the network element 101 is configured to deactivate 406 the enhanced service for the user terminal 102. The network element may inform 407 the user terminal on the deactivation so that the user terminal starts to use the "normal" SLA parameters (instead of the temporarily enhanced service parameters).

Figure 5:
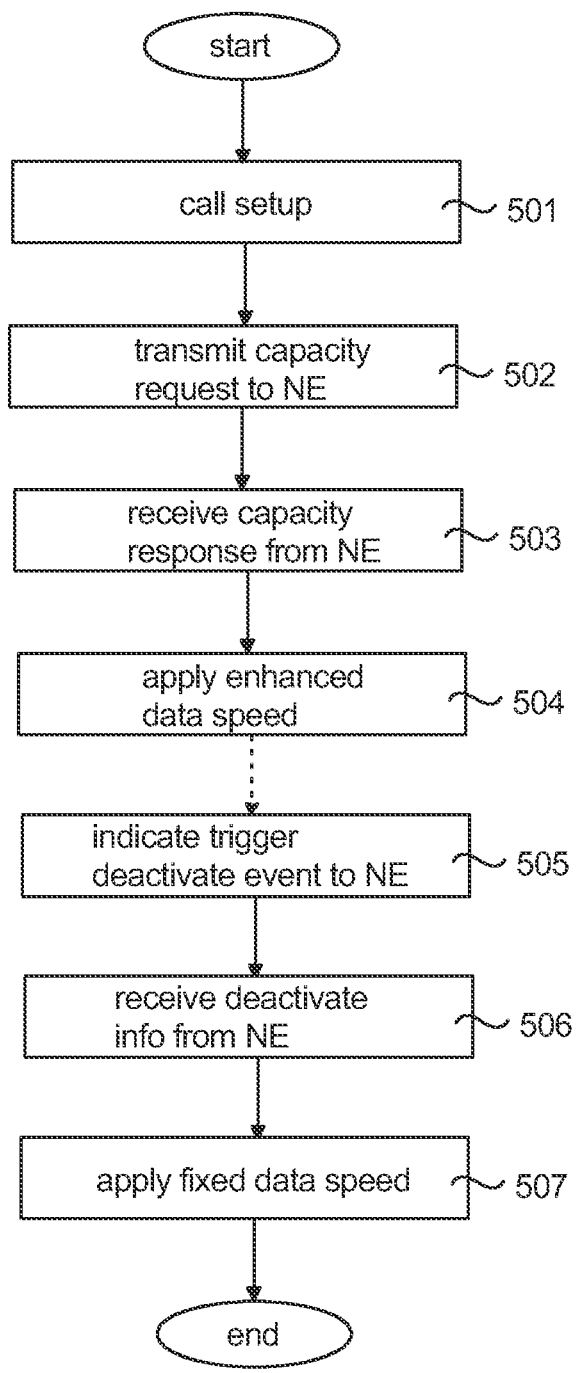
FIG. 5 shows a schematic diagram of a flow chart according to another exemplary embodiment of the invention.

FIG. 5 is a flow chart illustrating an exemplary embodiment. The user terminal (user equipment UE) 102 is configured to perform, in step 501, a triggering event such as an event related to setting up a call or maintaining a call. In response to the triggering event 501, a network capacity request message is transmitted 502 from the user terminal 102 to a network apparatus 101 comprising e.g. a radio network controller (RNC) or a base station (eNB).

Another option is that the capacity request message is transmitted from a core network node (such as MSC) to the network apparatus 101, e.g. in response to the triggering event. The user terminal 102 may receive 503 in a capacity response message from the network element 101 an acknowledgement informing the user terminal 102 on a new temporary QoS, a new temporary maximum data speed and/or another new (enhanced) temporary network service defined by the network element for the user terminal 102. In step 504, the user terminal 102 is able to start to use the enhanced service in communications in the network (in the area/during the time defined by the network element 101). During the call, temporary parameters such as the location of the user equipment 102, transferred data amount and time are constantly monitored by the network. In case some trigger indicates a need to deactivate an enhanced service (for example, the user has moved away from the "campaign area"), normal (fixed) SLA parameters may be taken into use. For example, in step 505, the user terminal 102 may leave the area were the enhanced service was defined to be used. The user terminal 102 transmits 505, to the network element 101, an indication that the user terminal 102 is leaving/has left the area. The network may inform the user terminal on a deactivation of the enhanced, wherein the user terminal receives, in step 506, deactivation information from the network element. In response to that, the user terminal starts 507 to use the "normal" SLA parameters (instead of the temporarily enhanced service parameters).

In an exemplary embodiment, the user equipment may be configured to display an indication of the activation and/or deactivation of the enhanced service to the user of the user equipment. The user may able to decline the activation of the enhanced service by pressing a predetermined button (buttons) on the user equipment or by entering a predetermined command by means of the user equipment.

The steps/points, signalling messages and related functions de-scribed above in FIGS. 1 to 5 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The server operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method comprising receiving, in a network apparatus, a capacity request message regarding a user terminal; in response to receiving the capacity request message, checking, in the network apparatus, one or more service parameters related to the user terminal; wherein if the checking reveals that enhanced network service activation criteria are fulfilled, said one or more service parameters are used to define, by using a suitable network algorithm, a temporarily enhanced network service for the user terminal, the temporarily enhanced network service exceeding the service level originally agreed for the user terminal.

According to another exemplary embodiment, there is provided an apparatus configured to receive a capacity request message regarding a user terminal; in response to receiving the capacity request message, check one or more service parameters related to the user terminal; wherein if the checking reveals that enhanced network service activation criteria are fulfilled, the apparatus is configured to use said one or more service parameters to define, by using a suitable network algorithm, a temporarily enhanced network service for the user terminal, the temporarily enhanced network service exceeding the service level originally agreed for the user terminal.

According to yet another exemplary embodiment, there is provided a user equipment configured to in response to a call setup event or call maintenance event in the user equipment, transmit a capacity request message to a network apparatus; receive a capacity response message from the network apparatus; wherein if the capacity response message includes information on a temporarily enhanced network service defined for the user equipment by using a suitable network algorithm, the temporarily enhanced network service exceeding the service level originally agreed for the user terminal, the user equipment is configured to utilize the temporarily enhanced network service during the call.

According to yet another exemplary embodiment, there is provided a computer-readable storage medium embodying a program of instructions executable by a processor to perform actions directed toward receiving, in a network apparatus, a capacity request message regarding a user terminal; in response to receiving the capacity request message, checking, in the network apparatus, one or more service parameters related to the user terminal; wherein if the checking reveals that enhanced network service activation criteria are fulfilled, said one or more service parameters are used to define, by using a suitable network algorithm, a temporarily enhanced network service for the user terminal, the temporarily enhanced network service exceeding the service level originally agreed for the user terminal.

According to yet another exemplary embodiment, there is provided an apparatus, wherein the parameters to be checked include one or more of the parameters selected from a location, time, user terminal identification, available data speed, available data amount, lowered cost indicator, network element identification, enhanced network services being offered, charged account identification, virtual SIM identification, and campaign identification.

According to yet another exemplary embodiment, there is provided an apparatus configured to carry out the defining by means of a capacity algorithm comprising an admission control algorithm, a packet scheduler algorithm, a home location register algorithm, a messages waiting element algorithm, a handover control algorithm, a load control algorithm, a medium access control algorithm, an enhanced node B application control algorithm, a radio link control algorithm, a radio resource control algorithm, and/or a transport resource manager algorithm.

According to yet another exemplary embodiment, there is provided an apparatus configured to transmit to the user terminal, a capacity response message informing the user terminal on the enhanced network service that the user terminal is able to start to use in communications in the network.

According to yet another exemplary embodiment, there is provided an apparatus configured to carry out the checking of the parameters in response to a call setup event and/or a call maintenance event related to the user terminal.

According to yet another exemplary embodiment, there is provided an apparatus configured to monitor, during a call, temporary parameters related to the user terminal, wherein if a need to deactivate an enhanced service is detected, the apparatus is configured to deactivate the enhanced service for the user terminal.

According to yet another exemplary embodiment, there is provided an apparatus configured to inform the user terminal on the deactivation in order the user terminal to start to use the original service parameters instead of the temporarily enhanced service parameters.

According to yet another exemplary embodiment, there is provided an apparatus configured to, if predetermined activation criteria is fulfilled, temporarily provide, for the user terminal, a data speed that exceeds the predefined maximum data speed agreed for the user terminal.

According to yet another exemplary embodiment, there is provided an apparatus configured to define a new temporary quality of service, a new temporary maximum data speed and/or other enhanced temporary network service for the user terminal.

According to yet another exemplary embodiment, there is provided an apparatus configured to store the temporary parameters in a database.

According to yet another exemplary embodiment, there is provided an apparatus configured to automatically activate monitoring of the temporarily enhanced service parameters used by a group of user terminals.

According to yet another exemplary embodiment, there is provided an apparatus configured to, if the monitoring reveals a network overload, deactivate the enhanced service for the user terminal and using the original service parameters instead of the temporarily enhanced service parameters.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

PS packet scheduler
SLA service level agreement
KPI key performance indicator
UE user equipment
GPS global positioning system
LTE long term evolution
3G third generation
MBA management based activation
LBS location-based system
QoS quality of service
ID identification
RNC radio network controller
IMEI international mobile equipment identity
3GPP third generation partnership project
SIM subscriber identity module
HLR home location register
VLR visitor location register
TV television
MSC mobile switching centre
MW messages waiting

The invention claimed is:

1. A method of capacity allocation in a communications system comprising a network apparatus, the method comprising:
receiving, in the network apparatus, a capacity request message regarding a user terminal; and
checking, in the network apparatus, in response to receiving the capacity request message, one or more service parameters related to the user terminal,
wherein if the checking reveals that enhanced network service activation criteria are fulfilled, said one or more service parameters are used to define, by using a suitable network algorithm, a temporarily enhanced network service for the user terminal,
wherein the temporarily enhanced network service exceeds a service level originally agreed for the user terminal;
monitoring automatically the one or more service parameters related to the user terminal; and
determining whether to deactivate the temporarily enhanced network service based on the one or more service parameters.

2. A method according to claim 1, wherein the service parameters to be checked include one or more of the parameters selected from a location, time, user terminal identification, available data speed, available data amount, lowered cost indicator, network element identification, enhanced network services being offered, charged account identification, virtual SIM identification, and campaign identification.

3. A method according to claim 1, wherein the suitable network algorithm is a capacity algorithm comprising at least one of an admission control algorithm, a packet scheduler algorithm, a home location register algorithm, a messages waiting element algorithm, a handover control algorithm, a load control algorithm, a medium access control algorithm, an enhanced node B application control algorithm, a radio link control algorithm, a radio resource control algorithm, and a transport resource manager algorithm.

4. A method as claimed in claim 1, wherein the checking of the service parameters is carried out in response to a call setup event and/or a call maintenance event related to the user terminal.

5. A method according to claim 1, wherein the monitoring of the one or more service parameters occurs during a call.

6. A method according to claim 5, further comprising:
informing the user terminal of the deactivation in order for the user terminal to start using the service level originally agreed to instead of the temporarily enhanced network service.

7. A method as claimed in claim 1, further comprising:
temporarily providing, for the user terminal, a data speed that exceeds a predefined maximum data speed agreed for the user terminal if predetermined activation criteria is fulfilled.

8. A method as claimed in claim 1, wherein the enhanced temporary network service includes at least one of a new temporary quality of service, a new temporary maximum data speed, and other enhanced temporary network service for the user terminal.

9. A method as claimed in claim 1, further comprising:
automatically activating monitoring of the service parameters used by a group of user terminals, wherein if the monitoring reveals a network overload, the method comprises deactivating the temporary enhanced network service for the user terminal and using the service level originally agreed to instead of the temporarily enhanced network service.

10. An apparatus for communications comprising:
at least one memory comprising computer program code;
at least one processor;
wherein the at least one memory and the computer program code are configured, with the at least one processor, to cause the apparatus at least to:
receive a capacity request message regarding a user terminal; check one or more service parameters related to the user terminal, in response to receiving the capacity request message,
wherein if the checking reveals that enhanced network service activation criteria are fulfilled, the apparatus is configured to use said one or more service parameters to define, by using a suitable network algorithm, a temporarily enhanced network service for the user terminal,
wherein the temporarily enhanced network service exceeds a service level originally agreed for the user terminal;
monitor automatically the one or more service parameters related to the user terminal; and
determine whether to deactivate the temporarily enhanced network service based on the one or more service parameters.

11. An apparatus according to claim 10, wherein the service parameters to be checked include one or more of the parameters selected from a location, time, user terminal identification, available data speed, available data amount, lowered cost indicator, network element identification, enhanced network services being offered, charged account identification, virtual SIM identification, and campaign identification.

12. An apparatus according to claim 10, wherein the suitable network algorithm is a capacity algorithm comprising an admission control algorithm, a packet scheduler algorithm, a home location register algorithm, a messages waiting element algorithm, a handover control algorithm, a load control algorithm, a medium access control algorithm, an enhanced node B application control algorithm, a radio link control algorithm, a radio resource control algorithm, and/or a transport resource manager algorithm.

13. An apparatus according to claim 10, wherein the at least one memory and the computer program code are configured, with the at least one processor, to cause the apparatus at least to:

transmit to the user terminal, a capacity response message informing the user terminal on the enhanced network service that the user terminal is able to start to use in communications in the network.

14. An apparatus as claimed in claim 10, wherein the checking of the one or more service parameters is carried out in response to a call setup event and/or a call maintenance event related to the user terminal.

15. An apparatus as claimed in claim 10, wherein the at least one memory and the computer program code are configured, with the at least one processor, to cause the apparatus at least to:

wherein the monitoring of the one or more service parameters occurs during a call.

16. An apparatus according to claim 15, wherein the at least one memory and the computer program code are configured, with the at least one processor, to cause the apparatus at least to:

inform the user terminal of the deactivation in order for the user terminal to start to use the service level originally agreed to instead of the temporarily enhanced network service.

17. An apparatus as claimed in claim 10, wherein the at least one memory and the computer program code are configured, with the at least one processor, to cause the apparatus at least to:

temporarily provide, for the user terminal, a data speed that exceeds a predefined maximum data speed agreed for the user terminal if predetermined activation criteria is fulfilled.

18. An apparatus as claimed in claim 10, wherein the defined temporarily enhanced network service includes at least one of a new temporary quality of service, a new temporary maximum data speed, and other enhanced temporary network service for the user terminal.

19. An apparatus as claimed in claim 10, wherein the at least one memory and the computer program code are configured, with the at least one processor, to cause the apparatus at least to:

store a temporary parameter in a database.

20. An apparatus as claimed in claim 10, wherein the at least one memory and the computer program code are configured, with the at least one processor, to cause the apparatus at least to:

automatically activate monitoring of the one or more service parameters used by a group of user terminals.

21. An apparatus as claimed in claim 20, wherein the at least one memory and the computer program code are configured, with the at least one processor, to cause the apparatus at least to:

deactivate the enhanced service for the user terminal if the monitoring reveals a network overload; and use the service levels originally agreed to instead of the temporarily enhanced network service.

22. A user equipment for communications, wherein the user equipment is configured to in response to a call setup event or call maintenance event in the user equipment, transmit a capacity request message to a network apparatus;

receive a capacity response message from the network apparatus;

wherein if the capacity response message includes information on a temporarily enhanced network service defined for the user equipment by using a suitable network algorithm, the user equipment is configured to utilize the temporarily enhanced network service during a call, wherein the temporarily enhanced network service exceeds a service level originally agreed for the user terminal, wherein the one or more service parameters related to the user terminal are automatically monitored by the network apparatus; and receive a message informing the user terminal to deactivate the temporarily enhanced network service, when the network apparatus has determined that the deactivation is needed based on the one or more service parameters.

23. A non-transitory computer-readable storage medium embodying a program of instructions executable by a processor to perform actions directed toward:

receiving, in a network apparatus, a capacity request message regarding a user terminal;

checking, in the network apparatus, one or more service parameters related to the user terminal, in response to receiving the capacity request message, wherein if the checking reveals that enhanced network service activation criteria are fulfilled, said one or more service parameters are used to define, by using a suitable network algorithm, a temporarily enhanced network service for the user terminal, wherein the temporarily enhanced network service exceeds a service level originally agreed for the user terminal; and monitoring automatically the one or more service parameters related to the user terminal; and determining whether to deactivate the temporarily enhanced network service based on the one or more service parameters.

* * * * *